United States Patent
Chien et al.

(10) Patent No.: US 8,707,181 B2
(45) Date of Patent: Apr. 22, 2014

(54) PREVIEW OF NEXT MEDIA OBJECT TO PLAY

(75) Inventors: Windy Chien, San Francisco, CA (US);
Gary Stewart, Santa Monica, CA (US);
Robert Kondrk, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 965 days.

(21) Appl. No.: 12/292,089

(22) Filed: Nov. 12, 2008

(65) Prior Publication Data

US 2010/0122166 A1     May 13, 2010

(51) Int. Cl.
*G06F 3/00*     (2006.01)

(52) U.S. Cl.
USPC ............ 715/716; 715/727; 715/719; 715/772

(58) Field of Classification Search
USPC ................... 715/716, 719, 727, 772, 817–819
See application file for complete search history.

(56) References Cited

U.S. PATENT DOCUMENTS

| | | | | |
|---|---|---|---|---|
| 5,892,507 A * | 4/1999 | Moorby et al. | | 715/205 |
| 6,166,314 A * | 12/2000 | Weinstock et al. | | 84/483.1 |
| 7,581,186 B2 * | 8/2009 | Dowdy et al. | | 715/727 |
| D609,715 S * | 2/2010 | Chaudhri | | D14/486 |
| 2005/0149872 A1 * | 7/2005 | Fong et al. | | 715/727 |
| 2006/0059526 A1 * | 3/2006 | Poslinski | | 725/88 |
| 2006/0064300 A1 * | 3/2006 | Holladay | | 704/224 |
| 2006/0212444 A1 * | 9/2006 | Handman et al. | | 707/5 |
| 2007/0011623 A1 * | 1/2007 | Billmaier et al. | | 715/784 |
| 2007/0014534 A1 * | 1/2007 | Kim | | 386/83 |
| 2007/0168413 A1 * | 7/2007 | Barletta et al. | | 709/203 |
| 2008/0098323 A1 * | 4/2008 | Vallone et al. | | 715/772 |
| 2008/0101773 A1 * | 5/2008 | Park et al. | | 386/124 |
| 2008/0295028 A1 * | 11/2008 | Nagasaka et al. | | 715/810 |
| 2008/0307348 A1 * | 12/2008 | Jones et al. | | 715/772 |
| 2009/0089837 A1 * | 4/2009 | Momosaki | | 725/40 |
| 2009/0129741 A1 * | 5/2009 | Kim | | 386/52 |
| 2009/0158326 A1 * | 6/2009 | Hunt et al. | | 725/38 |
| 2009/0254829 A1 * | 10/2009 | Rohde | | 715/727 |
| 2010/0058253 A1 * | 3/2010 | Son | | 715/863 |
| 2010/0262912 A1 * | 10/2010 | Cha | | 715/719 |

* cited by examiner

*Primary Examiner* — Ryan Pitaro
(74) *Attorney, Agent, or Firm* — Schwegman Lundberg & Woessner, P.A.

(57) ABSTRACT

A system and method for presenting reproduction of media objects. A plurality of media objects is retrieved. The plurality of media objects is reproduced one after another on a media reproduction system. One or more graphical objects are presented on a display of the media reproduction system. Each graphical object of the plurality of graphical objects corresponds to each of the plurality of media objects being reproduced. As each of the plurality of media objects is reproduced, a corresponding graphical object presented on the display moves from a beginning side of the display to an end side of the display in relation to an amount of the corresponding media object being reproduced. As reproduction of the plurality of media objects transitions from one media object to a next media object, the graphical object corresponding to the next media object to be reproduced is presented from the beginning side of the display.

16 Claims, 3 Drawing Sheets

PREVIEW OF NEXT MEDIA OBJECT TO PLAY

TECHNICAL FIELD

The disclosed embodiments relate generally to presenting reproduction of media objects. More particularly, the disclosed embodiments relate to systems, methods and programs for presenting reproduction of media objects on a display, and for allowing the user a preview of the next media object to play.

BACKGROUND

Current media players may be used for playing live or pre-recorded content, which may be played by streaming the content over the Internet to a media player, or loading the content (e.g., source media file) from a local media storage device to a media player. Content may be comprised of audio, video, slideshow pictures, or any combinations thereof. Content may be represented according to one of many media file types (e.g., MP3, M3U, MPEG(-1, -2, -4), QuickTime Movie, AU, MIDI, JPEG, GIF, TIFF). Media objects, including audio or video content, are often reproduced or played by media players or devices having media playing capabilities. As these media objects are played, graphics or text accompanying the media contents may be presented on a display screen to indicate how much media content has been played or to indicate the title or description of the content being played. For example, when a video clip is played on a display screen, the title of the video clip may appear at the bottom of the screen and a cursor icon may move along a track icon to indicate how much of the clip has been played.

When a group of media objects is played one after another, however, current media object reproduction systems do not take advantage of the display screen to provide a smooth transition between graphics accompanying the media object currently being played and graphics accompanying the next media object to be played. In addition, when a group of media objects is played one after another, current media object reproduction systems do not take advantage of the display screen to forecast the next media object to be played in an uninterrupted and aesthetically pleasing manner. Accordingly, there is a need for ways to take advantage of the display screen in a media object reproduction system so that graphics transition smoothly as media objects are played one after another.

SUMMARY OF EMBODIMENTS

Accordingly, the present invention is directed to a system and method for playing media content that substantially obviates one or more problems due to limitations and disadvantages of the related art.

In accordance with some embodiments, the present invention provides a method for presenting reproduction of media objects, wherein as reproduction of the plurality of media objects transitions from one media object to a next media object, a graphical object corresponding to the next media object to be reproduced is presented from the beginning side of the display.

In accordance with some embodiments, the present invention provides a system for presenting reproduction of a plurality of media objects, wherein as reproduction of the plurality of media objects transitions from one media object to a next media object, the graphical object corresponding to the next media object to be reproduced is presented from the beginning side of the display.

In accordance with some embodiments, the present invention provides a computer readable storage medium storing instructions for retrieving a plurality of media objects, and for reproducing the plurality of media objects one after another on a media reproduction system, wherein as each of the plurality of media objects is reproduced, a corresponding graphical object presented on the display moves from a beginning side of the display to an end side of the display in relation to an amount of the corresponding media object being reproduced, and as reproduction of the plurality of media objects transitions from one media object to a next media object, the graphical object corresponding to the next media object to be reproduced is presented from the beginning side of the display.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for presenting reproduction of media objects comprises retrieving a plurality of media objects; reproducing the plurality of media objects one after another on a media reproduction system; and presenting a plurality of graphical objects on a display of the media reproduction system, each graphical object of the plurality of graphical objects corresponding to each of the plurality of media objects being reproduced, wherein as each of the plurality of media objects is reproduced, a corresponding graphical object presented on the display moves from a beginning side of the display to an end side of the display in relation to an amount of the corresponding media object being reproduced, and as reproduction of the plurality of media objects transitions from one media object to a next media object, the graphical object corresponding to the next media object to be reproduced is presented from the beginning side of the display.

In another aspect, a system for presenting reproduction of a plurality of media objects comprises a media reproduction device on which the plurality of media objects is reproduced one after another; and a display, wherein a plurality of graphical objects is presented on the display, each graphical object of the plurality of graphical objects corresponding to each of the plurality of media objects being reproduced, wherein as each of the plurality of media objects is reproduced, a corresponding graphical object presented on the display moves from a beginning side of the display to an end side of the display in relation to an amount of the corresponding media object being reproduced, and as reproduction of the plurality of media objects transitions from one media object to a next media object, the graphical object corresponding to the next media object to be reproduced is presented from the beginning side of the display.

In yet another aspect, a computer readable storage medium storing one or more programs, the one or more programs comprising instructions for retrieving a plurality of media objects; reproducing the plurality of media objects one after another on a media reproduction system; and presenting a plurality of graphical objects on a display of the media reproduction system, each graphical object of the plurality of graphical objects corresponding to each of the plurality of media objects being reproduced, wherein as each of the plurality of media objects is reproduced, a corresponding graphical object presented on the display moves from a beginning side of the display to an end side of the display in relation to an amount of the corresponding media object being reproduced, and as reproduction of the plurality of media objects transitions from one media object to a next media object, the graphical object corresponding to the next media object to be reproduced is presented from the beginning side of the display.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DESCRIPTION OF EMBODIMENTS

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of standalone system or client-server compatible system containing any type of client, network, server, and database elements.

Figure 1:
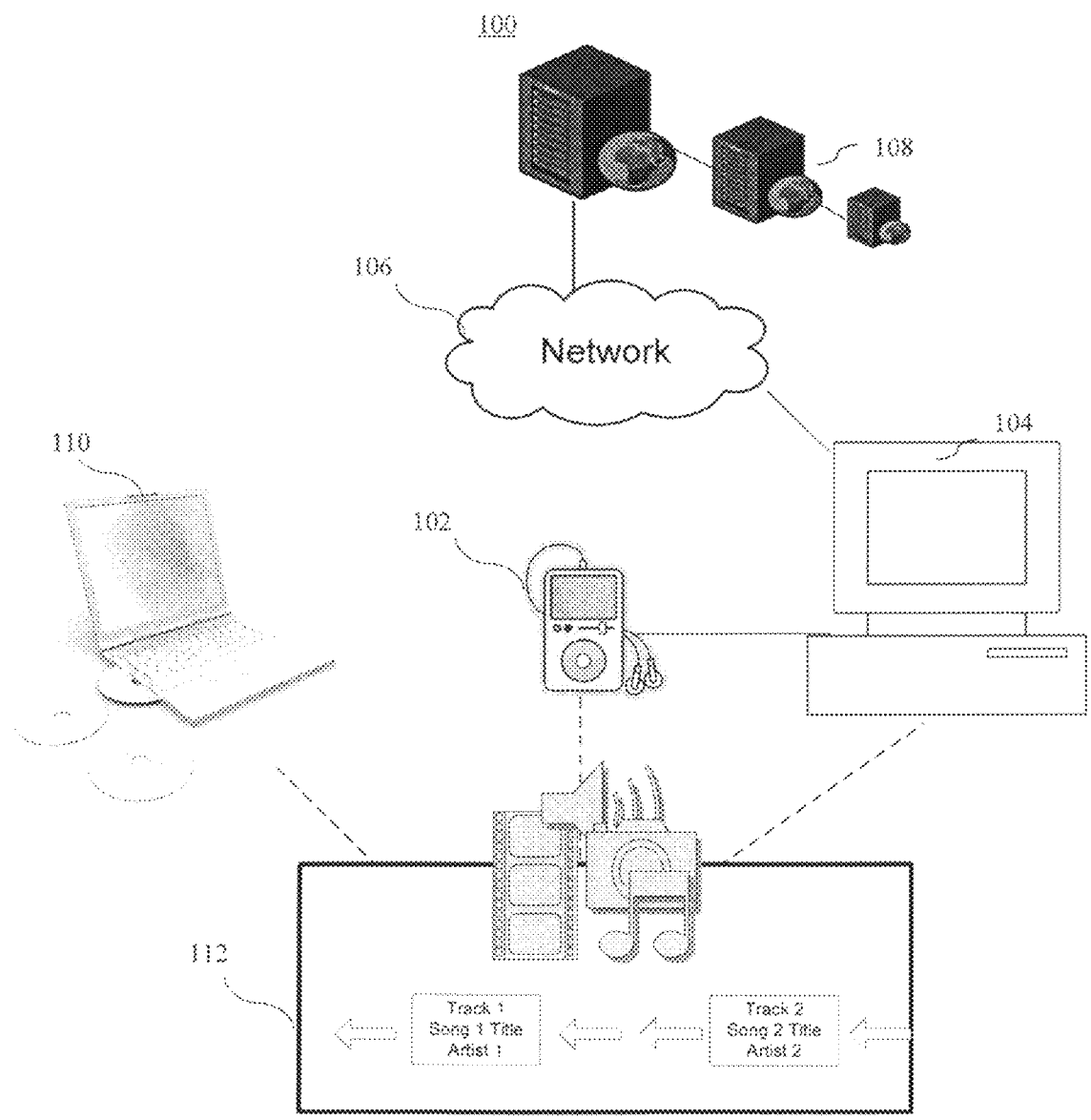
FIG. 1 is a block diagram illustrating a media object reproduction system 100 in accordance with some embodiments.

FIG. 1 is a block diagram illustrating a media object reproduction system 100 in accordance with some embodiments. Media objects are data or files containing any type of audio and/or video content. In some embodiments, media objects include songs, television shows, movie clips, and so forth. The media object reproduction system 100 comprises a media player 102. The media player 102 may be connected to a computer 104, which may further be connected to a network 106. The computer 104 may itself have media playing capabilities. The network 106 may connect computer 104 and media player 102 to one or more servers or computer systems 108 with access to one or more media storage devices. Requests may be sent to the one or more servers or computer systems 108 over network 106 to retrieve or transmit one or more media objects to the computer 104 or the media player 102. In some embodiments, the media objects are played directly on computer 104 or media player 102 as the media objects are transmitted (e.g., streaming multimedia). In other embodiments, the media objects are stored to one or more local storage devices (not shown) on or connected to computer 104 or media player 102, before they are played by computer 104 or media player 102.

As shown in FIG. 1, in some embodiments, the media object reproduction system 100 comprises a computer 110 that loads media objects from local storage, such as hard drives, flash drives, CD-ROM/RW drives, tape drives, solid state memories, and so forth. The computer 110 may also load media objects via a connection to one or more other computers or servers (not shown). The media object reproduction system 100 may comprise other types of media object reproduction devices. For example, in some embodiments, media objects may be transmitted, stored and reproduced by a mobile handheld device having media object playback capabilities. In some other embodiments, media objects may be reproduced by a conventional media object player (e.g., DVD player). Each media object reproduction device has or is connected to a display screen for displaying graphical or video content. As shown in FIG. 1, for example, media player 102 and computers 104, 110 each have or are connected to a display screen 112 for displaying graphical or video content. As media objects are reproduced by media player 102, computer 104, 110, or some other media object reproduction device, graphical objects corresponding to the media objects being reproduced may be presented on the display screen 112.

Figure 2:
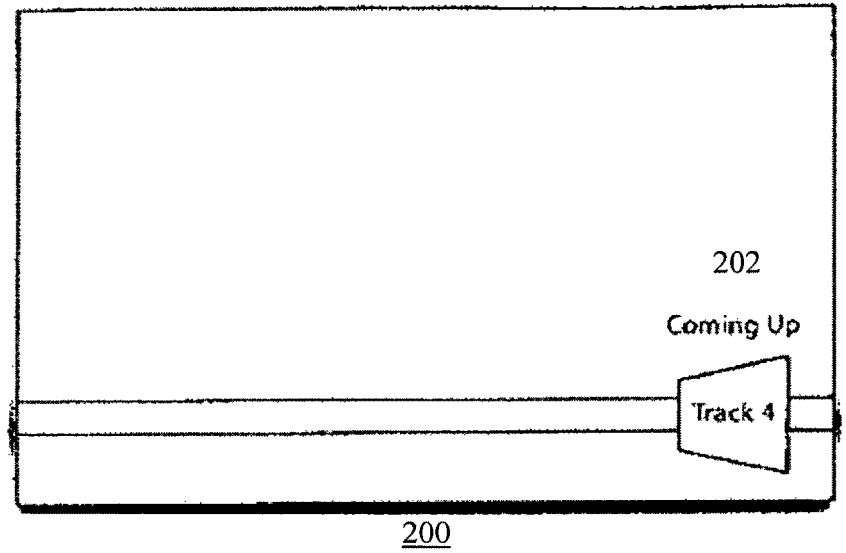
FIG. 2 is a schematic diagram illustrating, in accordance with some embodiments, a graphical object being presented on a display screen 200, the graphical object corresponding to a media object being reproduced.
Figure 2:
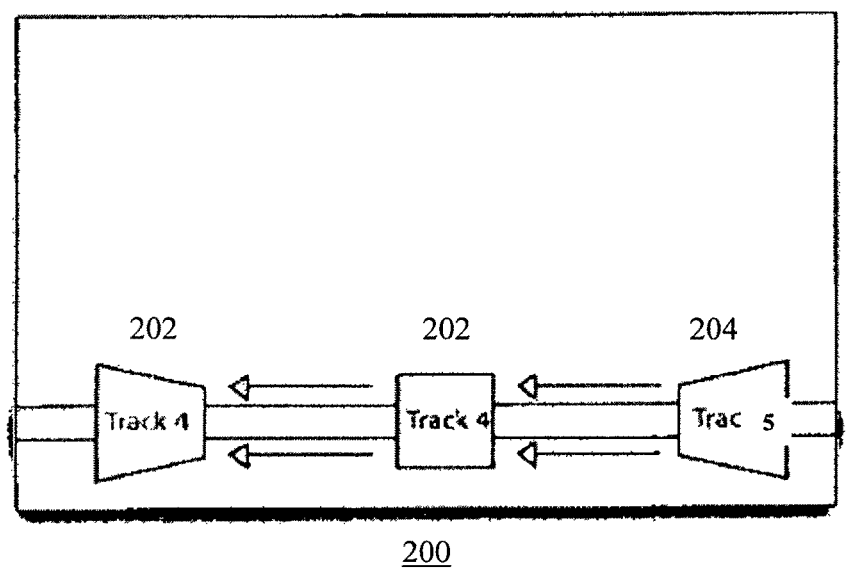

FIG. 2 is a schematic diagram illustrating, in accordance with some embodiments, a graphical object being presented on a display screen 200, the graphical object corresponding to a media object being reproduced. Graphical objects may include texts, graphics, themes, animations, avatars, and so forth. Each graphical object may correspond to a media object by presenting information about that media object. For example, when the media object is a video clip, the corresponding graphical object may include information about the video clip as well as graphics and themes identifying the video clip.

Each media object may be part of a group of media objects to be reproduced according to an order. In some embodiments, for example, a group of songs from a selected group of songs are played by a media playing device, one after another. In some embodiments, the order is predetermined by a user according to the user's preferences. In some embodiments, the order may be random. As a song is being played from the group of songs, a graphical object 202 corresponding to the song being played moves across the display screen 200 from a beginning side of the display screen 200 to an end side of the display screen 200. In some embodiments, the graphical object 202 moves from the right side of the screen to the left side of the screen. In some embodiments, the graphical object 202 may identify the song being played by presenting the track number of the song within the group of songs. In some embodiments, the graphical object 202 also may identify the song being played by presenting information about the song, such as song title and artist. Other graphical objects or themes may be presented on the display screen 200 while each song is played.

As one song finishes or is about to finish playing and the next song begins or is about to begin playing, graphical object 204 identifying the next song appears from the beginning side of the display screen 200, indicating that a next song is about to begin or has begun playing. In some embodiments, the graphical object 204 identifying the next song appears at the beginning side of the display screen 200 before the current song has finished playing. In some embodiments, the graphical object 204 identifying the next song appears along with a description such as "next song" or "coming up." As the current song is played, graphical object 202 corresponding to the current song moves across the display screen 200. In some embodiments, as the song transitions to the next song in the group, a new graphical object 204 appears from the beginning side of the screen and moves across the screen along the same direction as the previous graphical object 202. In some embodiments, each graphical object transitions smoothly across the display screen 200 to the next graphical object. In some embodiments, the first song in the group of songs is played after the last song in the group of songs finishes playing so that the group of songs is played in a loop-like manner. In such embodiments, the graphical object corresponding to the first song in the group may transition smoothly across the display screen 200 following the graphical object corresponding to the last song of the group.

The media object also may be a video that is presented in the display screen 200 when played by a media playing device. The video may be part of a group of videos to be presented in the display screen 200 one after another. As one video is being played in the display screen 200, graphical object 202 corresponding to the video moves across the display screen 200 from one side to another. The position of the graphical object 202 on the display screen 200 indicates how much of the video has being played. The graphical object itself may indicate information about the video. For example, if the video is an episode from a television show, the graphical object may present the title of the show, the title of the episode, and a brief description of the episode. As the display screen 200 transitions from one video to the next video from the group of videos, graphical object 204 corresponding to the next video appears from one side of the screen and begins to move across the screen. In some embodiments, the graphical object 204 identifying the next video appears along with a description such as "next clip" or "coming up." As the video is played by a media playing device, graphical object 202 moves across the display screen 200. In some embodiments, as the video transitions to the next video in the group of videos to be played, a new graphical object 204 appears from the beginning side of the display screen 200 and moves across the display screen 200 along the same direction as the previous graphical object 202. In some embodiments, each graphical object transitions smoothly across the display screen 200 to the next graphical object.

Figure 3:
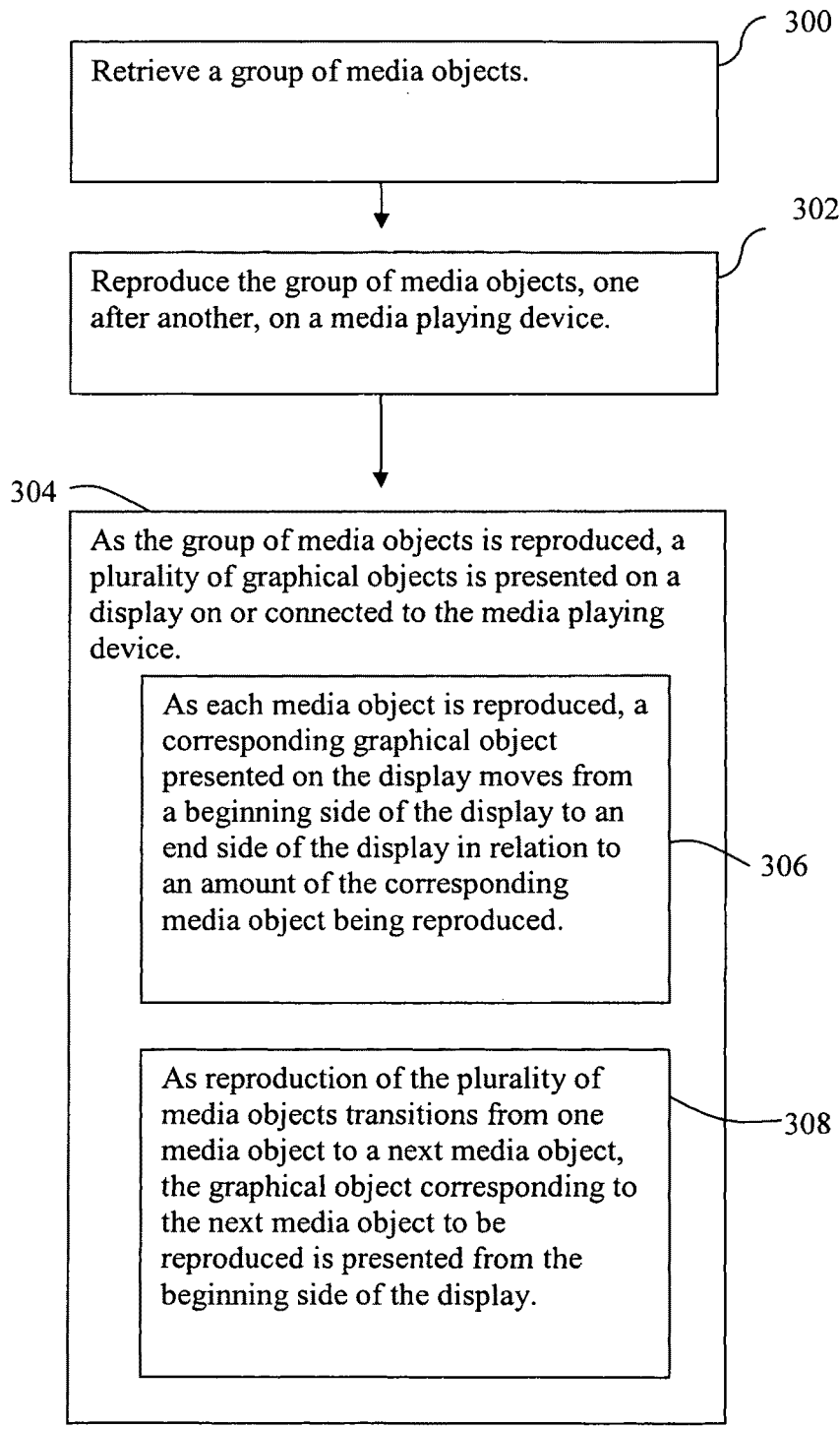
FIG. 3 is a flow diagram illustrating a method of presenting graphical objects corresponding to the reproduction of media objects in accordance with some embodiments.

FIG. 3 is a flow diagram illustrating a method of presenting graphical objects corresponding to the reproduction of media objects in accordance with some embodiments. First, a group of media objects is retrieved by a media playing device from local storage or via a remote network (300). The group of media objects is then reproduced one after another on the media playing device in accordance to a predetermined or random order (302). As the group of media objects is reproduced, a plurality of graphical objects is presented on a display on or connected to the media playing device (304). Each graphical object of the plurality of graphical objects corresponds to each media object of the group of media objects being reproduced. As each media object is reproduced, the corresponding graphical object presented on the display moves from a beginning side of the display to an end side of the display in relation to an amount of the corresponding media object being reproduced (306). As reproduction of the plurality of media objects transitions from one media object to a next media object, the graphical object corresponding to the next media object to be reproduced is presented from the beginning side of the display (308).

The foregoing description, for purpose of explanation, has been described with reference to specific embodiments. The illustrative discussions above, however, are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention, and various embodiments with various modifications as are suited to the particular use contemplated.

What is claimed is:

1. A method for presenting reproduction of media objects, comprising:
   retrieving a plurality of media objects;
   reproducing the plurality of media objects one after another on a media reproduction system; and
   presenting a plurality of graphical objects on a singular graphical progression path of a display of the media reproduction system, each graphical object of the plurality of graphical objects corresponding to each of the plurality of media objects being reproduced,
   wherein as each of the plurality of media objects is reproduced, a corresponding graphical object presented on the display moves from a beginning side to an end side of the singular graphical progression path of the display in relation to an amount of the corresponding media object being reproduced, and
   as reproduction of the plurality of media objects transitions from a first media object to a second media object, the graphical object corresponding to the second media object to be reproduced is presented on the singular graphical progression path and from the beginning side of the display.

2. The method of claim 1 wherein as reproduction of the plurality of media objects transitions from a first media object to a second media object, the graphical object corresponding to the second media object is presented from the beginning side of the display before the second media object is reproduced.

3. The method of claim 2 wherein each corresponding graphical object presented on the display changes position by moving from a right side to a left side of the display in relation to the amount of the corresponding media object being reproduced.

4. The method of claim 1 wherein each graphical object comprises a track icon indicative of a track number of the corresponding media object.

5. The method of claim 1 wherein each graphical object presents information identifying each corresponding media object.

6. A system for presenting reproduction of a plurality of media objects, comprising:
   a media reproduction device on which the plurality of media objects is reproduced one after another; and
   a display,
   wherein a plurality of graphical objects is presented on a singular graphical progression path of the display, each graphical object of the plurality of graphical objects corresponding to each of the plurality of media objects being reproduced,
   wherein as each of the plurality of media objects is reproduced, a corresponding graphical object presented on the display moves from a beginning side to an end side of the singular graphical progression path of the display in relation to an amount of the corresponding media object being reproduced, and
   as reproduction of the plurality of media objects transitions from a first media object to a second media object, the graphical object corresponding to the second media object to be reproduced is presented on the singular graphical progression path and from the beginning side of the display.

7. The system of claim 6 wherein as reproduction of the plurality of media objects transitions from a first media object to a second media object, the graphical object corresponding to the second media object is presented from the beginning side of the display before the second media object is reproduced.

8. The system of claim 7 wherein each corresponding graphical object presented on the display changes position by moving from a right side to a left side of the display in relation to the amount of the corresponding media object being reproduced.

9. The system of claim 6 wherein each graphical object comprises a track icon indicative of a track number of the corresponding media object.

10. The system of claim 6 wherein each graphical object presents information identifying each corresponding media object.

11. The system of claim 6 wherein the display is on the media playing device.

12. A non-transitory computer readable storage medium having stored thereon instructions that are executable to cause a computer system to perform operations comprising:
    retrieving a plurality of media objects;
    reproducing the plurality of media objects one after another on a media reproduction system; and
    presenting a plurality of graphical objects on a singular graphical progression path of a display of the media reproduction system, each graphical object of the plurality of graphical objects corresponding to each of the plurality of media objects being reproduced, wherein as each of the plurality of media objects is reproduced, a corresponding graphical object presented on the display moves from a beginning side to an end side of the singular graphical progression path of the display in relation to an amount of the corresponding media object being reproduced, and
    as reproduction of the plurality of media objects transitions from a first media object to a second media object, the graphical object corresponding to the second media object to be reproduced is presented on the singular graphical progression path and from the beginning side of the display.

13. The non-transitory computer readable storage medium of claim 12 wherein as reproduction of the plurality of media objects transitions from a first media object to a second media object, the graphical object corresponding to the second media object is presented from the beginning side of the display before the second media object is reproduced.

14. The non-transitory computer readable storage medium of claim 13 wherein each corresponding graphical object presented on the display changes position by moving from a right side to a left side of the display in relation to the amount of the corresponding media object being reproduced.

15. The non-transitory computer readable storage medium of claim 12 wherein each graphical object comprises a track icon indicative of a track number of the corresponding media object.

16. The non-transitory computer readable storage medium of claim 12 wherein each graphical object presents information identifying each corresponding media object.

* * * * *

UNITED STATES PATENT AND TRADEMARK OFFICE
CERTIFICATE OF CORRECTION

| | | |
|---|---|---|
| PATENT NO. | : 8,707,181 B2 | Page 1 of 1 |
| APPLICATION NO. | : 12/292089 | |
| DATED | : April 22, 2014 | |
| INVENTOR(S) | : Chien et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1111 days.

Signed and Sealed this
Twenty-eighth Day of July, 2015

Michelle K. Lee
*Director of the United States Patent and Trademark Office*